(12) United States Patent
Pan

(10) Patent No.: US 8,253,271 B2
(45) Date of Patent: Aug. 28, 2012

(54) HOME POWER SUPPLY SYSTEM

(76) Inventor: Yang Pan, Shanghai (CN)

( * ) Notice: Subject to any disclaimer, the term of this patent is extended or adjusted under 35 U.S.C. 154(b) by 518 days.

(21) Appl. No.: 12/581,136

(22) Filed: Oct. 17, 2009

(65) Prior Publication Data

US 2011/0089759 A1    Apr. 21, 2011

(51) Int. Cl.
*H02J 3/00* (2006.01)
*H02J 1/12* (2006.01)

(52) U.S. Cl. ............................................. 307/26; 307/25
(58) Field of Classification Search .................... 307/25, 307/26
See application file for complete search history.

(56) References Cited

U.S. PATENT DOCUMENTS

| | | | |
|---|---|---|---|
| 4,718,233 A | 1/1988 | Barrett | |
| 6,678,176 B2 | 1/2004 | Lumsden | |
| 7,468,566 B2 * | 12/2008 | Serrano et al. ................... | 307/68 |
| 7,893,558 B2 * | 2/2011 | Lee ............................... | 307/10.1 |
| 7,936,078 B2 * | 5/2011 | Pavlak ............................ | 290/44 |
| 7,948,117 B2 * | 5/2011 | Lathrop et al. .................. | 307/64 |
| 7,962,769 B1 * | 6/2011 | Patel et al. ...................... | 713/300 |
| 8,159,178 B2 * | 4/2012 | Serban .......................... | 320/101 |
| 2002/0171391 A1 | 11/2002 | Batts-Gowins | |
| 2003/0051476 A1 | 3/2003 | Reno | |
| 2007/0013340 A1 | 1/2007 | Mattichak | |
| 2007/0221267 A1 | 9/2007 | Fornage et al. | |
| 2007/0296276 A1 | 12/2007 | Blackman | |
| 2008/0029153 A1 | 2/2008 | Margalit | |
| 2008/0143188 A1 | 6/2008 | Adest et al. | |
| 2009/0093916 A1 * | 4/2009 | Parsonnet et al. ............. | 700/286 |

* cited by examiner

*Primary Examiner* — Hal Kaplan

(57) ABSTRACT

A power supply system is disclosed. The system comprises an AC power source from a power grid and a DC power source from an alternative power generation system. The alternative power generation system may comprise one or a plurality of solar systems. The system may also comprise one or a plurality of wind turbines. The AC power generated by a generator of the turbine is converted into the DC power by a device comprising a rectifier. There are two groups of electrical appliances connected to the system. The first group receives the AC power only and the second group receives the AC and/or the DC power supplies. The power supply system provides a means of supplying the electrical appliances the DC power with the higher priority and therefore minimizes power consumption from the power grid.

17 Claims, 7 Drawing Sheets

HOME POWER SUPPLY SYSTEM

CROSS-REFERENCE TO RELATED APPLICATIONS

The application is related to the application 12577152.

BACKGROUND

1. Field of Invention

This invention relates to a power supply system, specifically to a home power supply system including an AC source from a power grid and a DC source from an alternative power generation system.

2. Description of Prior Art

In recent years, concerns have been raised that high demand for electricity taxing the capacity of existing electricity generating plants. Furthermore, concerns regarding the availability and environmental safety of fossil and nuclear fuel are being raised. As a result of the above factors, the price of electricity has been on a path of steady increasing.

Furthermore, the electrical utility industry has for some time labored under the problem of supplying cost effective power to comply system peak-demand period requirements. The concept of peak-demand power supplementation is not new. A number of systems have been tested and implemented over years based upon batteries, hydroelectric, and combustion turbine. Each of the systems, by nature or by implementation, has had problems. Some are expensive and others are not acceptable environmentally.

Solar systems have been used with gained popularity to resolve at least partially the peak-demand issue of the power grid. A solar system may convert generated DC electricity from solar panels into AC electricity and be used to power electrical appliance. The generated DC power may be purchased by a power grid company after it is converted into AC power by utilizing an inverter. Over the years inverters have progressed from electromechanical to semiconductor devices. The use of the inverters not only causes the loss of electrical power but also the increase of overall cost of the solar system.

In addition to the solar systems, wind turbines have also been employed to provide clean energy. The wind turbine generates an AC power from the kinetic energy of the wind through a system comprises a rotator, a gearbox and a generator. The AC power is rectified into a DC power and is further converted into AC power with the same frequency as the AC power from the power grid. The inverter is used to convert the DC power into the AC power, which results in a loss of electricity and also in an increase in the cost.

It is desirable to have a system and method for utilizing the solar energy and/or wind turbines to supplement the AC power from the power grid while eliminating the use of the inverters to reduce the cost of employing the alternative power generation systems.

SUMMARY OF THE INVENTION

It is therefore an object of the present invention to provide a power supply system minimizing the use of the AC power from the power grid by consuming a DC power from an alternative power generation system as the priority.

It is another object of the present invention to provide a power supply system including an alternative power generation system comprising solar systems and/or wind turbines. The system provides DC power to electrical appliances directly which receive both AC and DC power supplies.

The power supply system based upon the present inventive concept comprises a first means of power supply based upon AC power from the power grid and a second means of power supply based upon DC power generated from an alternative power generation system comprising the solar systems and/or the wind turbines. There are two groups of electrical appliances connected to the system. The first group of appliances receives the AC power supply only and the second group of appliances receives the AC and/or DC power supplies. A switch is used to connect the second group of appliances to the DC power as it is available. A power management device comprises a demand detector for detecting required DC power and a supply detector for detecting the available DC power. A controller of the power management device controls an operation of minimizing the power consumption from the power grid as long as the DC power from the alternative source is available. A battery of the power management device may be used to store the generated surplus DC power. The battery may also be used as a supplementary for powering the appliances form the second group.

BRIEF DESCRIPTION OF THE DRAWINGS

For a more complete understanding of the present invention and its various embodiments, and the advantages thereof, reference is now made to the following description taken in conjunction with the accompanying drawings.

DETAILED DESCRIPTION

The present invention will now be described in detail with references to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
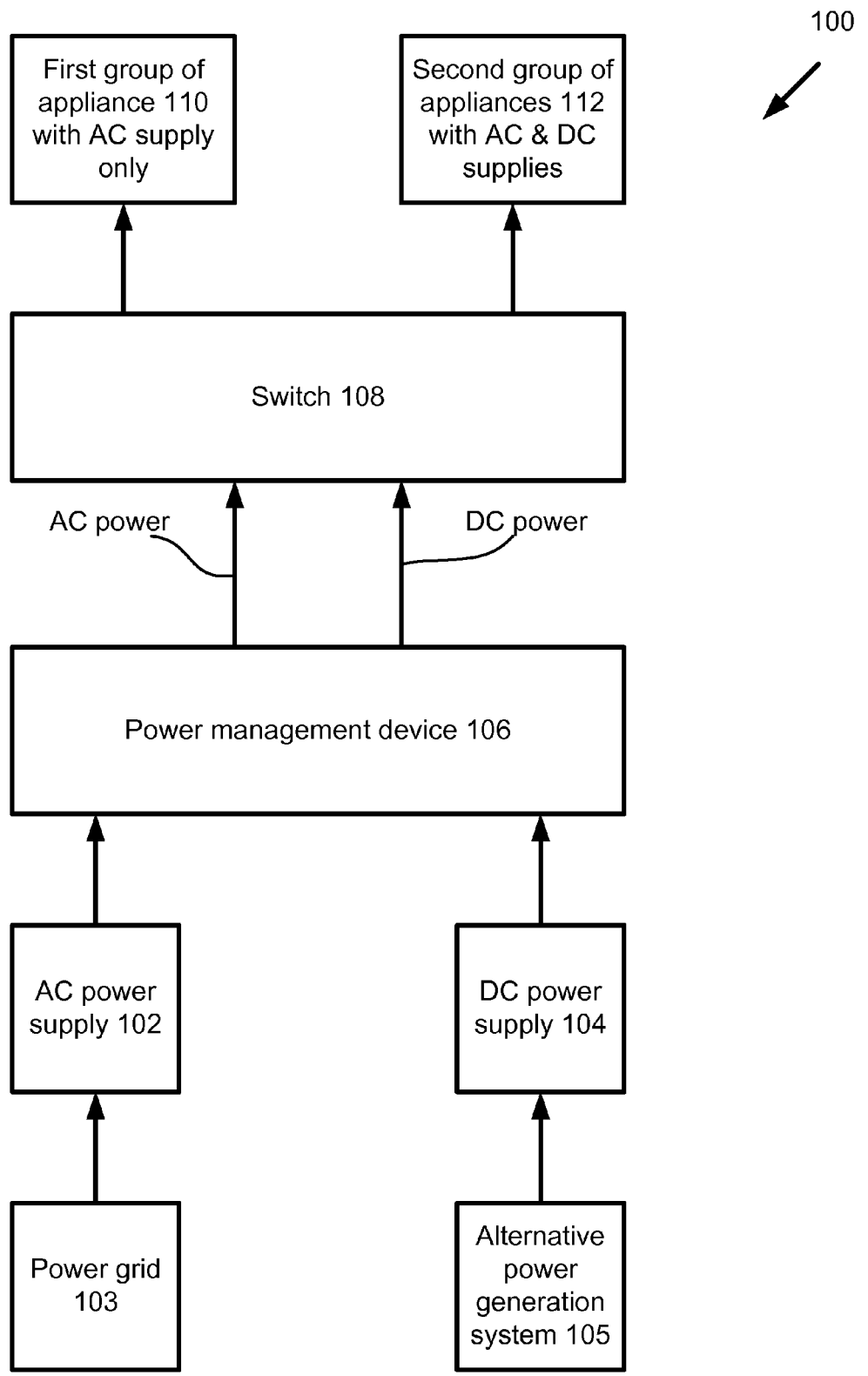
FIG. 1 is a schematic diagram of a power supply system for a plurality of electrical appliances.

FIG. 1 is a schematic diagram of a power supply system for a plurality of electrical appliance. The system 100 comprises an AC power supply 102 and a DC power supply 104. The AC power supply 102 supplies the AC power from a power grid 103. The DC power supply 104 supplies The DC power from an alternative power generation system 105. 105 may comprise one or multiple solar systems. 105 may also comprise one or multiple wind turbines. The solar system generates the DC electrical output based upon well known photovoltaic effects. The wind turbine converts the kinetic energy into the mechanical energy by a rotator and a gearbox and further converts the mechanical energy into the AC electricity by a generator. The generated AC electricity is typically not in the same frequency as the AC electricity from the power grid 103 and therefore cannot be consumed directly. A rectifier is used to convert the AC power into a DC power. In some applications, the DC power is further converted into the AC power with the same frequency as the power grid by an inverter. In the present invention, the DC power generated from the wind turbines may be employed directly. The cost of employing the alternative power generation system 105 is reduced significantly by eliminating the use of inverters. If more than one power sources are used for the alternative power generation system 105, the DC power supply 104 may have a feature to combine all DC power sources into a single DC output.

The system 100 further comprises a power management device 106 for processing the incoming powers from 102 and 104 and for distributing the processed powers to the electrical appliances through a switch 108. There are two groups of electrical appliances used in the system 100. The first group of appliance 110 receives the AC power supply only. It means that the first group of appliances can only take the AC power for their operations. The AC power is the power from the power grid 103. The second group of appliance 112 receives the AC and/or the DC power supplies. It means that the appliances of the second group may receive both AC and DC power supplies for their operation. The second group of appliances, therefore, can consume DC power from the alternative power generation system directly whenever it is available.

Figure 2:
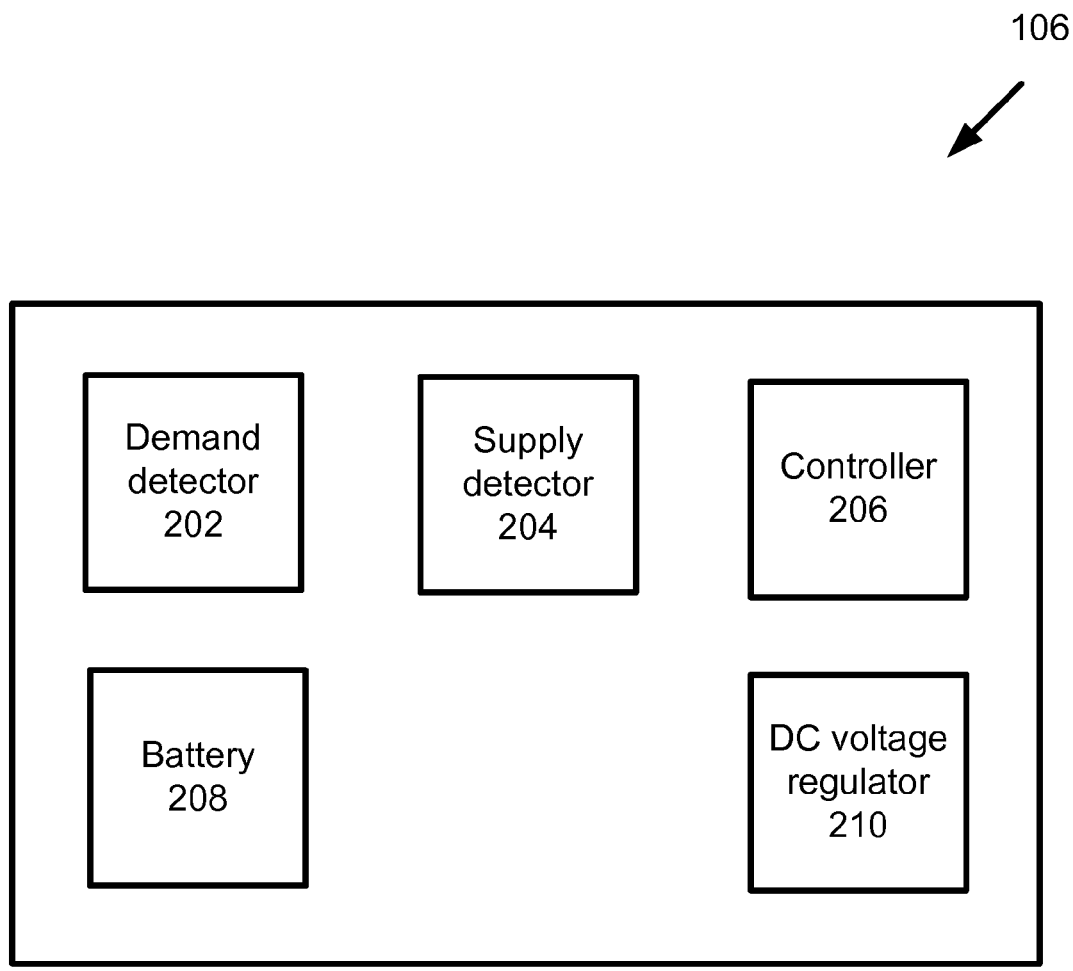
FIG. 2 is a functional block diagram of a power management device of the power supply system.

FIG. 2 is a functional block diagram of the power management device 106 of the power supply system 100. The device 106 comprises a demand detector 202 and a supply detector 204. The detector 202 is used to detect the required DC power for the operations of the second group of appliances 112. The detector 204 is used to detect the DC power generated by the alternative power generation system 105. The operations of detecting the demand and the supply are controlled by a controller 206. In an exemplary case, the controller 206 determines through the demand detector 202 the required DC power for all connected second group of appliances.

According to one aspect of the operation of the demand detector 202, the DC power from alternative power generation system 105 supplemented by the DC power drawn from a battery 208 may be used to supply temporally DC power requirement for all connected appliances of the second group. The required DC power is therefore determined by adding the generated DC power and the required DC power from the battery 208. If the DC power is indeed required from the battery 208, the AC power from the power grid 103 will be used to replace the DC power from the battery. If the DC power is not required from the battery 208, the DC power generated from the alternative power source is sufficient for powering the appliances from the second group and the surplus DC power will be stored in the battery 208. The detector 202 may be an operational procedure represented by a software module. 202 may also comprise a piece of hardware and/or firmware. It should be noted that the appliances from the first group are always powered by the AC power supply 102.

The battery 208 may be a re-chargeable battery. According to one implementation, 208 may be a deep-cycle re-chargeable battery as typically adopted for a solar system. According to another implementation, the battery 208 may also be charged by the AC power from the power grid 103. The power stored in the battery 208 may be used to power the appliances from the second group while the alternative power generation system 105 does not supply the stable DC power. For example, solar systems cease to generate DC power at the night. The power stored in the battery 208 may be used at the night for the appliances from the second group. However, it should be noted that the battery 208 should reserve a minimum amount of power to support the operation of the power management device 206.

A DC voltage regulator 210 is also included in the device 106 as shown in FIG. 2. The DC power supply 104 generated from the alternative power generation system 105 may need to be regulated to be consumed by the electrical appliances.

Because the AC power from the power grid is always available for the system 100, the controller 206 has a feature to use the AC power as a backup power whenever it is required such as for example, when the alternative power generation system is malfunction due to technical problems. It is important that such a default feature is implemented to prevent disruption of operations of the electrical appliances.

Figure 3:
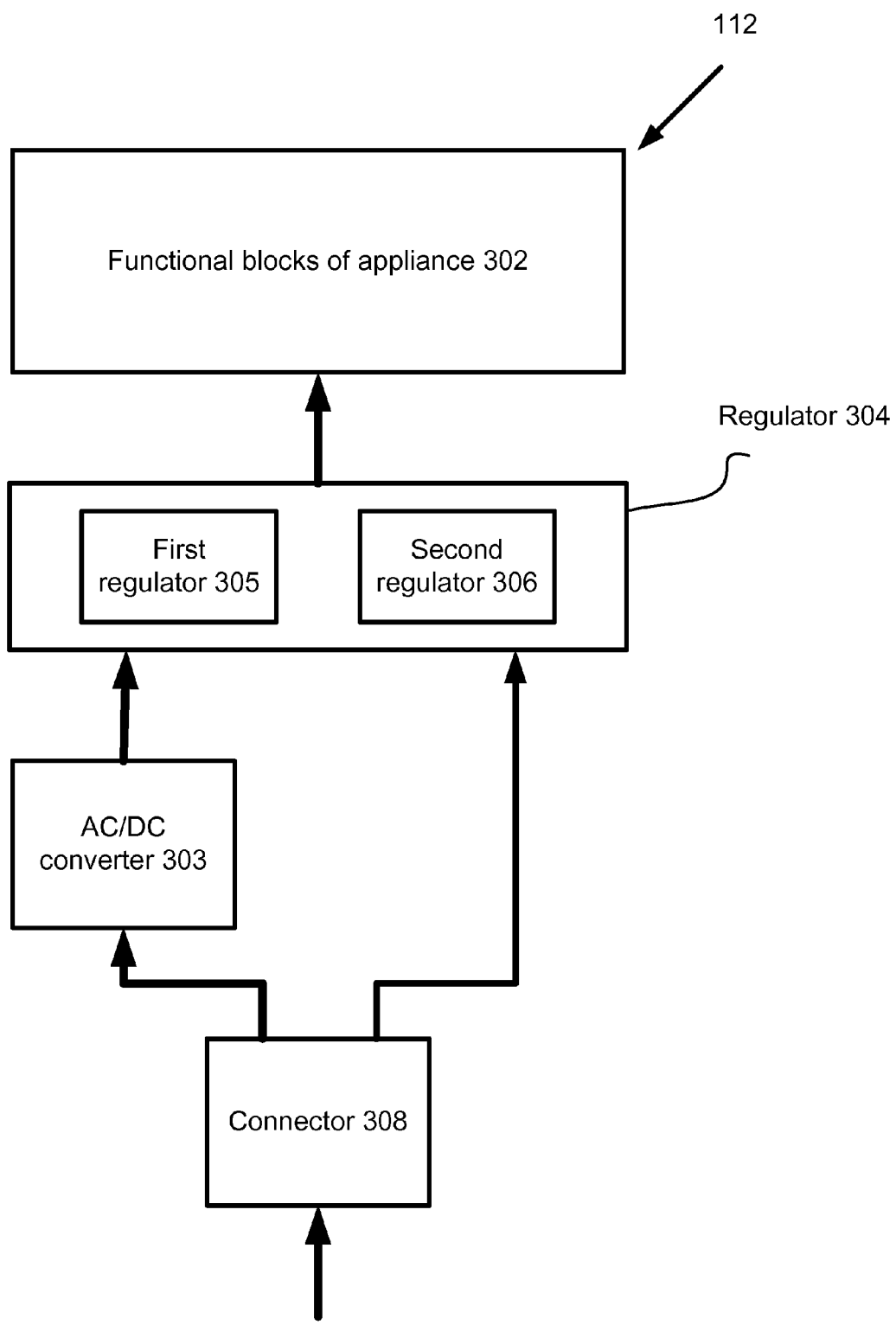
FIG. 3 is a schematic diagram of the appliance that receives AC and/or DC power supplies.

Functional blocks of an exemplary appliance from the second group are further illustrated in FIG. 3. Block 302 represents all functional blocks of the appliance except for the power supply unit of the appliance. The power supply unit comprises an AC path including an AC/DC converter 303 and a voltage regulator 304. The regulator 304 comprises a first voltage regulator 305 for regulating the output voltage from the AC/DC converter 303 for the operation of 302. The unit further comprises a DC path for receiving power from the alternative power generation system 105 through the power management device 106 and the switch 108. The received DC power may be further regulated by the voltage regulator 304 including the second voltage regulator 306 to satisfy the voltage requirement of 302.

According to one aspect of the present invention, one of the two power paths is selected by the controller 206 in the power management device 106. The selection is based upon the generated and required DC powers. If the DC path is selected, 302 is connected by a connector 308 to the DC power supply through the power management device 106 and the switch 108.

Figure 4:
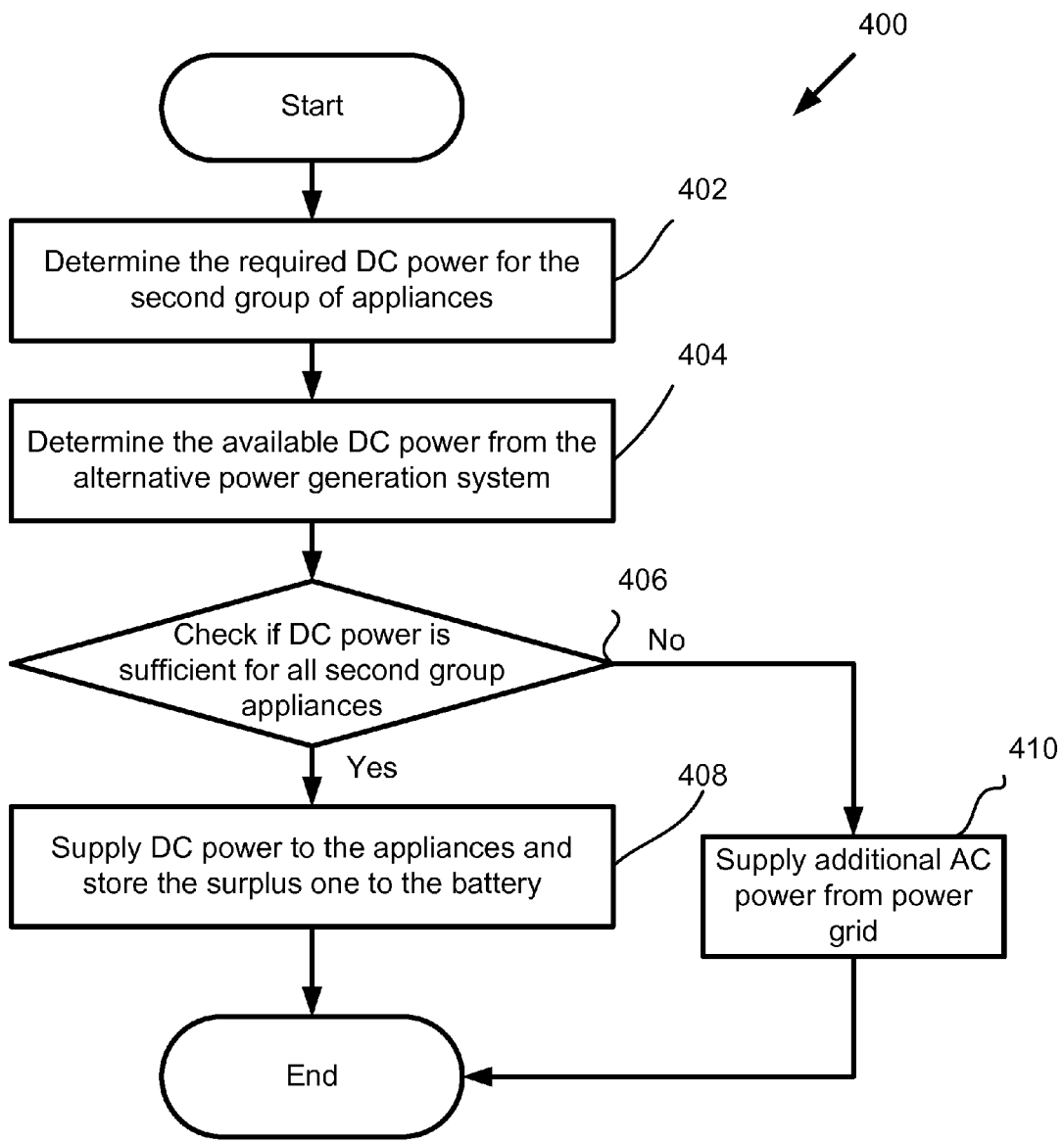
FIG. 4 is a flow diagram depicting steps of the operation of the power supply system.

FIG. 4 is a flow diagram depicting steps of a process illustrating the operation of the power supply system 100. Process 400 starts with step 402 that the DC power required for powering all second group appliances connected to the system 100 is determined by the demand detector 202 controlled by the controller 206. The generated DC power from the alternative power generation system 105 is determined in step 404 by the supply detector 204. In step 406, the controller 206 checks if the available DC is sufficient for powering all the second group appliances. If the result is positive, the DC power is directed to power the appliances and the surplus power is stored in the battery 208. If the result is negative in step 406, all generated DC power is consumed and additional AC power from the power grid 103 is used to supplement the second group appliances 112 in step 410. According to one aspect of the present invention, the controller 206 determines and allocates a subgroup of appliances 112 for receiving the DC power. The other appliances in the second group receive AC power from the power grid 103.

Figure 5:
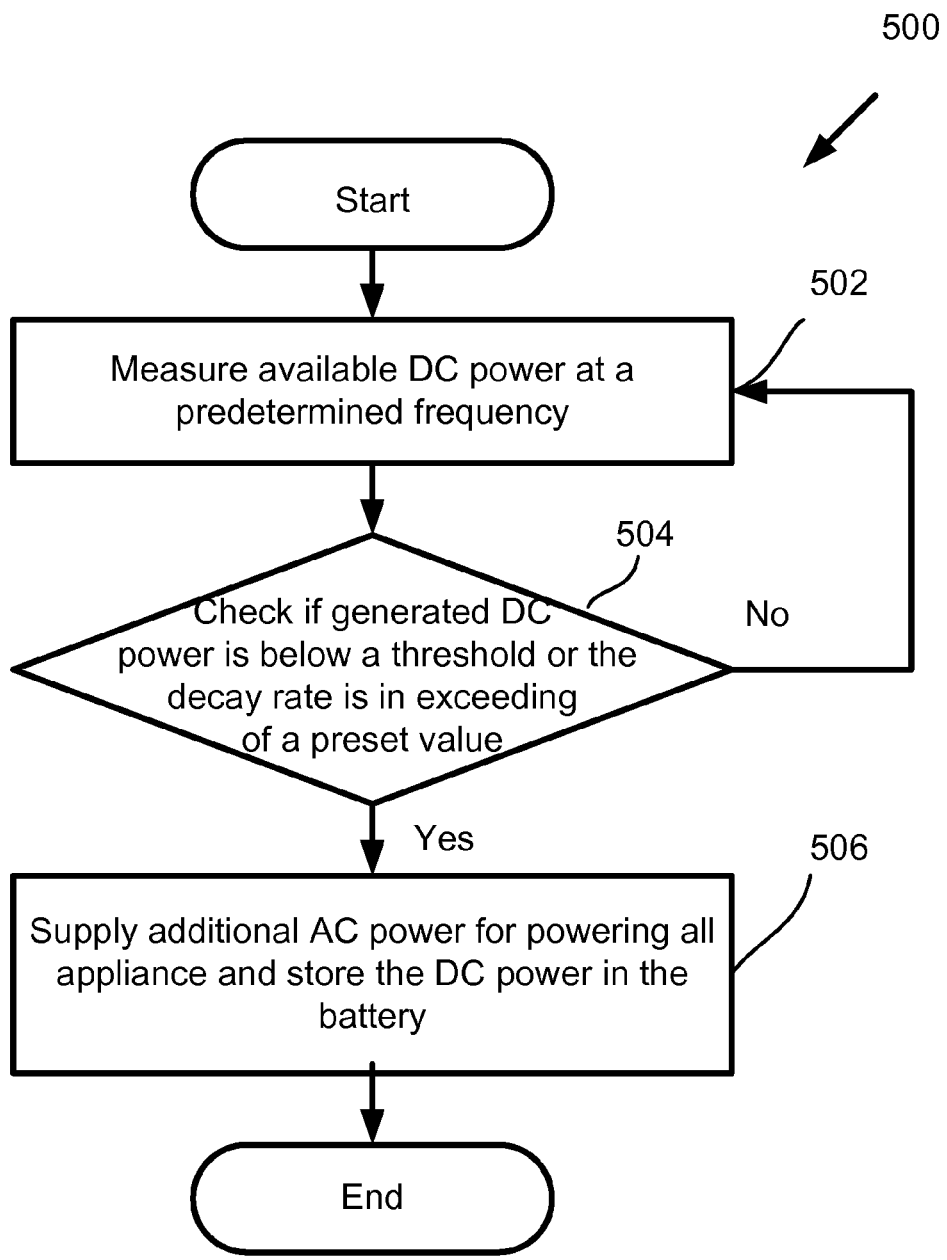
FIG. 5 is a flow diagram depicting steps of a process illustrating the operation of the power supply system when the generated DC power is no long a stable source.

FIG. 5 is a flow diagram depicting steps of a process 500 illustrating the operation of the power supply system 100 when the generated DC power is no long a stable source. The process 500 starts with step 502 that the available DC power is measured by the supply detector 204 in a predetermined frequency such as for example, every five minutes. In step 504, the controller 206 checks if the generated DC power is below a threshold or the decay rate of the DC power is in exceeding of a preset value. If the solar system is employed in the alternative power generation system 105, the generated DC power is reduced quickly when it is near the sunset. If the result is positive according to the step 504, the AC power from the power grid is directed to the second group appliances being powered by the DC power in step 506. The DC path in the appliance is concurrently switched off. The generated DC power, although unstable, may still be stored in the battery 208. The generated DC power may also be simply abandoned.

Figure 6:
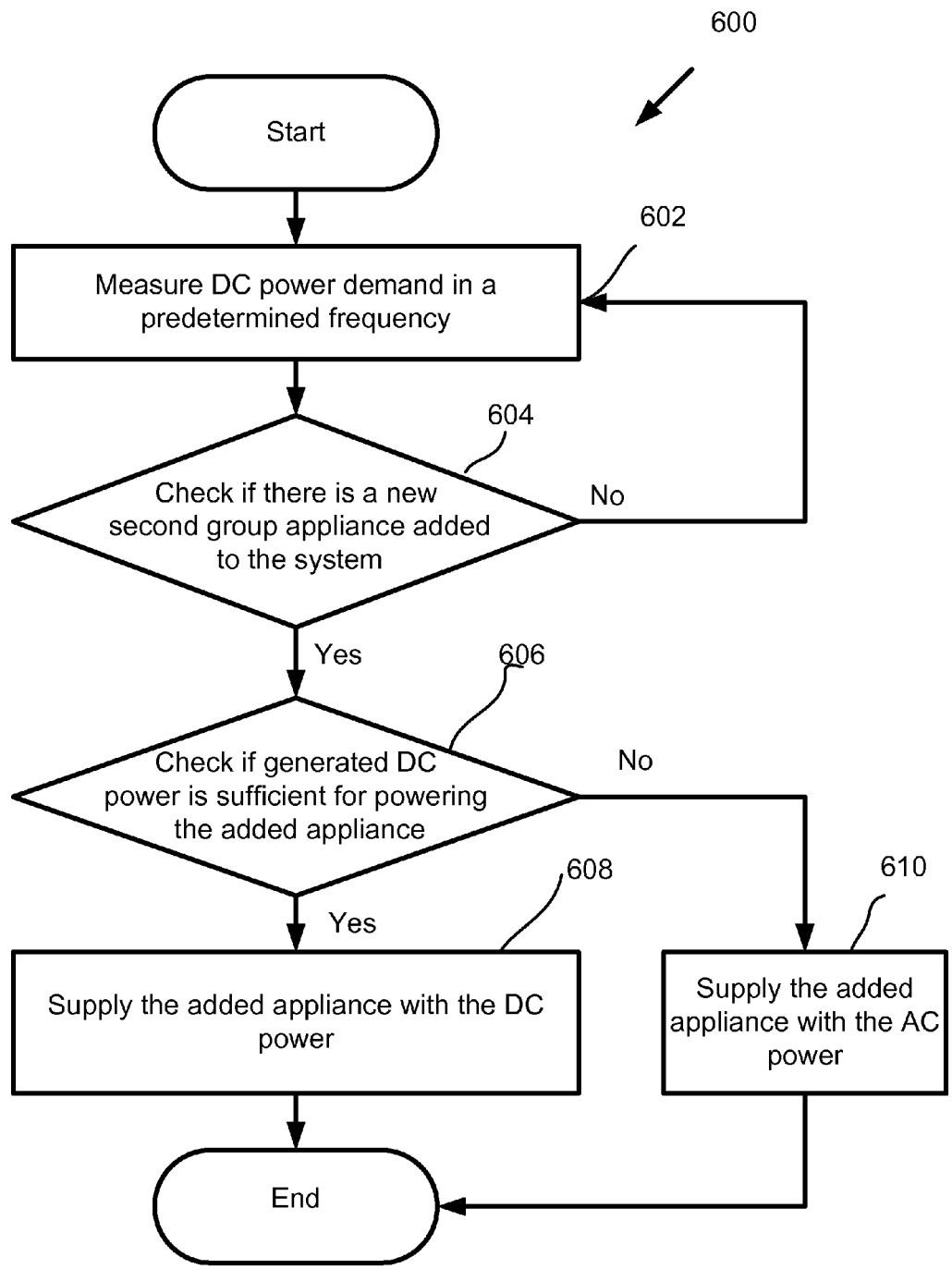
FIG. 6 is a flow diagram depicting steps of a process illustrating the operation of the power supply system when a new appliance is connected to the system.

FIG. 6 is a flow diagram depicting steps of a process 600 illustrating the operation of the power supply system 100 when a new appliance is added to the system. The process 600 starts with step 602 that DC power in demand by the appliances is determined by the demand detector 202 in a predetermined frequency. According to one aspect of the present invention, the demand detector 202 has a feature to alter a sudden increase or a sudden decrease in demand to the controller 206. In step 604, the controller 206 checks if there is a new appliance from the second group is added to the system 100. If the result is positive according to the step 604, the controller checks if the available DC power including the surplus one being stored into the battery 208 is sufficient for powering the added appliance in step 606. If the DC power is sufficient, it is then supplied to power the newly added appliance in step 608. Otherwise, the added appliance is powered by the AC power from the power grid 103 in step 610.

Figure 7:
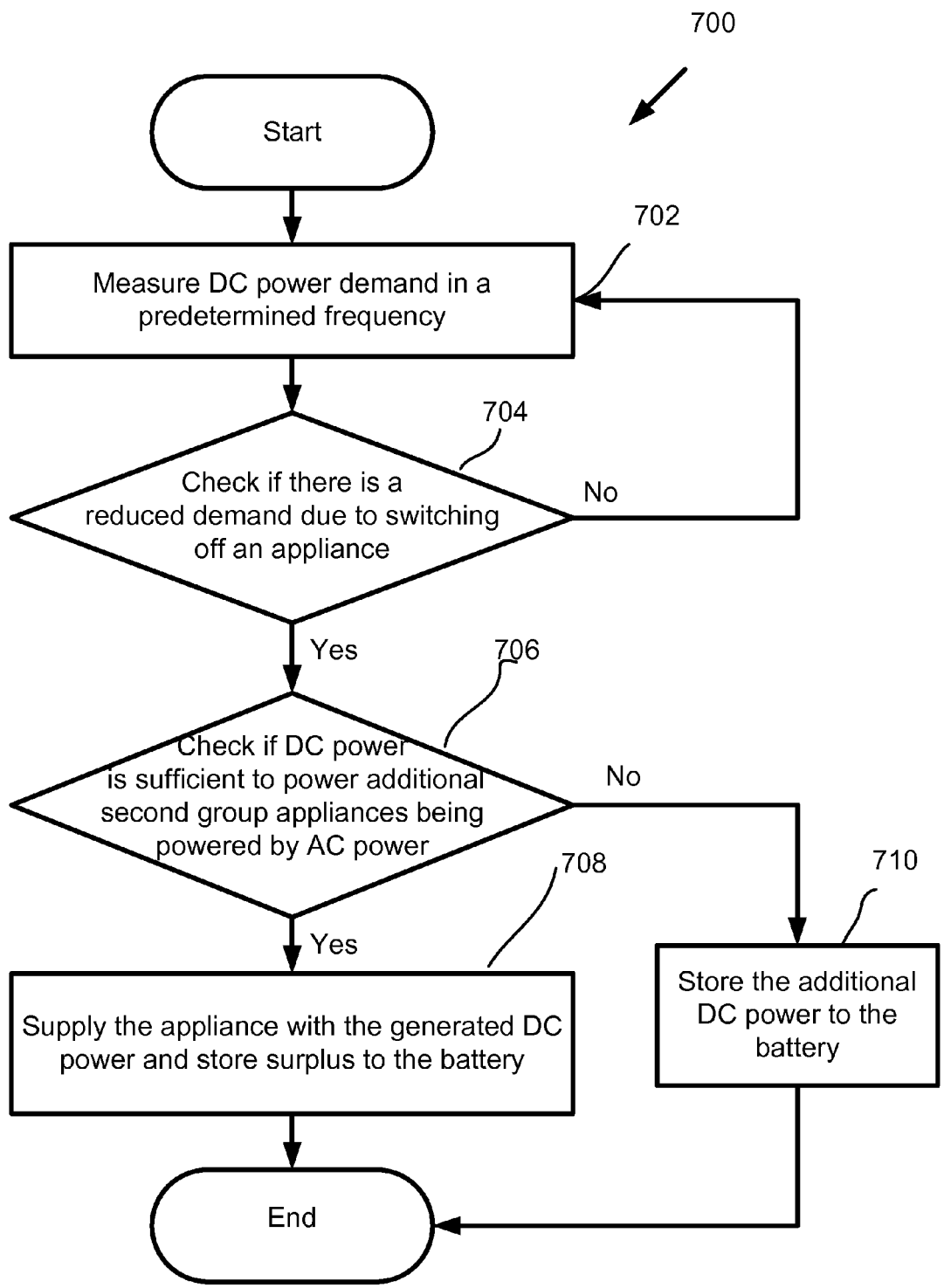
FIG. 7 is a flow diagram depicting steps of a process illustrating the operation of the power supply system when an appliance is removed from the system.

FIG. 7 is a flow diagram depicting steps of a process 700 illustrating the operation of the power supply system 100 when an appliance is removed from the system. The process 700 starts with step 702 that DC power in demand by the appliances is determined by the demand detector 202 in a predetermined frequency. According to one aspect of the present invention, the demand detector 202 has a feature to alter a sudden increase or a sudden decrease in demand to the controller 206. In step 704, the controller 206 checks if there is a reduced DC power demand due to switching off an appliance in the second group. If the result is positive according to the step 704, the controller 206 checks if the increased available DC power is sufficient for powering additional second group appliances being powered by the AC power in step 706. If the DC power is sufficient, the increased DC power is supplied to power one or more appliances in the second group in step 708. Otherwise, the increased DC power is stored into the battery 208 in step 710.

The invention claimed is:

1. A power supply system for a plurality of electrical appliances including a first group of appliances receiving an AC power supply only and a second group of appliances receiving an AC and/or a DC power supply, the system comprising:
   (a) a first means of power supply providing an AC power from a power grid;
   (b) a second means of power supply providing a DC power generated by an alternative power generation system;
   (c) a power management device pertaining to reducing power consumption from the power grid, the device comprising:
      i. a power demand detector for detecting DC power requirements for the appliances from the second group; and
      ii. a power supply detector for detecting the DC power generated from the alternative power generation system; and
   (d) a switch providing a means of selecting from the first and the second means of power supplies for the second group of appliances.

2. The system as recited in claim 1, wherein said alternative power generation system for generating the DC power further comprising one or a plurality of solar systems.

3. The system as recited in claim 1, wherein said alternative power generation system for generating the DC power further comprising one or a plurality of wind turbines.

4. The system as recited in claim 3, wherein said wind turbines further comprising a rotator, a gearbox, a generator and a rectifier for converting the AC power from the generator into the DC power.

5. The system as recited in claim 1, wherein said second group of appliances further comprising a power management unit including an AC power supply path and a DC power supply path, wherein either said AC power supply path or said DC power supply path may be selected by said power management device.

6. The system as recited in claim 1, wherein said power management device further comprising a voltage regulator for regulating the generated DC power to meet requirements of the appliances.

7. The system as recited in claim 1, wherein said power management device further comprising a re-chargeable battery for storing surplus DC power generated from the alternative power generation system.

8. The system as recited in claim 7, wherein said battery further providing a means of supplying the power for powering said power management device and providing another means of supplying the power for powering the appliances from the second group in a supplementary manner.

9. A method of supplying electrical power from a power grid and an alternative power generation system to a plurality of electrical appliances, including a first group of appliances receiving an AC power only and a second group of appliances receiving an AC power and/or a DC power, through a power management device and a switch, the method comprising:
   (a) determining available DC power generated from the alternative power generation system;
   (b) determining the required DC power for the second group of appliances;
   (c) supplying all generated DC power to the second group of appliances if the required DC power is more than the generated DC power; or
   (d) supplying the required DC power to the second group of appliances and storing the surplus DC power to a battery if the required DC power is less than the generated DC power.

10. The method as recited in claim 9, wherein said method further comprising a step of storing all generated DC power to the battery if the generated DC power is below a threshold or a decay rate of the generated DC power is in excess of a preset value.

11. The method as recited in claim 9, wherein said method further comprising a step of supplying DC power from the battery to power the appliances from the second group.

12. The method as recited in claim 9, wherein said alternative power generation system comprising one or a plurality of solar systems.

13. The method as recited in claim 9, wherein said alternative power generation system comprising one or a plurality of wind turbines.

14. A power management device for processing of incoming powers from a power grid and an alternative power generation system; and for distributing of the processed power to a plurality of electrical appliances including a first group receiving an AC power only and a second group receiving an AC and/or a DC power, the device comprising:
   (a) a power demand detector for detecting required DC power for the second group of appliances;

(b) a power supply detector for detecting the DC power generated from the alternative power generation system; and (c) a controller for controlling operations of said device, wherein said demand detector further comprising a means of detecting the required DC power by employing the DC power from the battery as a supplementary power.

15. The device as recited in claim 14, wherein said device further comprising a voltage regulator.

16. The device as recited in claim 14, wherein said device further comprising a battery including a re-chargeable battery.

17. The device as recited in claim 14, wherein said device further comprising a switch for connecting the appliances from the second group to either the AC power or the DC power controlled by the controller.

\* \* \* \* \*